US006757378B1

(12) United States Patent
Kunisch

(10) Patent No.: US 6,757,378 B1
(45) Date of Patent: Jun. 29, 2004

(54) METHOD AND TELECOMMUNICATIONS CENTER FOR RECOGNIZING CONNECTION REQUESTS AT A SUBSCRIBER LINE

(75) Inventor: Paul Kunisch, Puchheim (DE)

(73) Assignee: Siemens AG, Munich (DE)

( * ) Notice: Subject to any disclaimer, the term of this patent is extended or adjusted under 35 U.S.C. 154(b) by 853 days.

(21) Appl. No.: 09/656,708

(22) Filed: Sep. 7, 2000

(30) Foreign Application Priority Data

Sep. 7, 1999 (DE) .......................... 199 42 691

(51) Int. Cl.[7] .............................................. H04M 3/00
(52) U.S. Cl. ....................................... 379/377; 379/164
(58) Field of Search ........................... 379/35, 377, 164

(56) References Cited

U.S. PATENT DOCUMENTS 5,394,465 A * 2/1995 Jo ................................ 379/377
6,584,195 B1 * 6/2003 Yamanishi et al. .......... 379/377

OTHER PUBLICATIONS

"Handbuch für die Teleckommunikation," Jung et al. pp. 5–6, 5–7 (1998).

* cited by examiner

Primary Examiner—Minsun Oh Harvey
Assistant Examiner—Jefferey Harold
(74) Attorney, Agent, or Firm—Neifeld IP Law, PC

(57) ABSTRACT

In a circuit arrangement for recognizing connection requests at an analog subscriber line in which a number of subscriber terminal devices such as an analog telephone and an MSFM modem, are connected in parallel, set up and clear down connections are enabled independently of one another. For this purpose, a first threshold valve and a second threshold value are defined for the loop current in the subscriber line. A connection request can be respectively initiated by one of the subscriber terminal devices by means of closing its cradle switch. When the cradle switch of this first device is thus closed, the loop current exceeds the first threshold value, and when the cradle switch of a further device for initiating a connection request is also closed, the loop current exceeds the correspondingly defined second (higher) threshold value. As a result of these threshold value transgressions, the connection requests can be recognized and processed independently of one another.

16 Claims, 3 Drawing Sheets

METHOD AND TELECOMMUNICATIONS CENTER FOR RECOGNIZING CONNECTION REQUESTS AT A SUBSCRIBER LINE

BACKGROUND OF THE INVENTION

1. Field of the Invention

The present invention relates to a method for recognizing respective connection requests from telecommunication devices that are connected in parallel to an analog subscriber line, and relates to a telecommunication switching center with a subscriber line-interface, which is configured for recognizing connection requests of a number of telecommunication devices that are connected in parallel to an analog subscriber line.

2. Description of the Prior Art

A particular use of the present invention is referred to as "data-over-voice application". In data-over-voice applications, analog terminal devices (telephones, fax machines, answering machines, etc.) as well as devices referred to as "multi-standard-fast-modems" (MSFM) are connected in parallel to an analog subscriber line. Preferably, the different devices that are connected in parallel to the analog subscriber line are decoupled via filters for reducing their mutual influence upon one another.

Analog subscriber line circuits generally evaluate the loop closure in the terminal device as an event for a connection request, the indication threshold being at approximately 10 mA and the minimal loop current being at approximately 20 mA.

FIG. 3 shows the loop current through an analog telephone, as is known from Jung, Warnecke, "Handbuch fuer die Telekommunikation", Springer-Verlag, N.Y., 1998, for example. The signaling of the shown analog telephone 1 is transmitted by means of DC and AC data signals within the transmission range of the telephone network between the telephone 1 and the allocated subscriber switching center 3 via the subscriber line 7. The connection request is thereby signalized in the analog telephone by means of closing the cradle switch 5 and is therefore signalized by means of a DC loop. Then, a direct-current, which is recognized by an indicator in the switching center 3, such as a relay or a detector circuit, flows via the cradle switch 5 and the voice circuit M of the telephone. The further actions in the switching center 3 are initiated by the loop indicator, which is now active. When the user hangs up after the conversation, the cradle switch 5 opens and the DC loop is interrupted. The initiation of the utilized devices in the network node is caused by the power-down mode (or idle state) of the loop indicator resulting therefrom.

As already mentioned, the indication threshold (threshold value) for acquiring a connection request lies at approximately 10 mA, and the minimal loop current lies at approximately 20 mA in the steady state. Therefore, loop currents above the threshold value are interpreted as a state referred to as the off-hook state, and loop currents below the threshold value are interpreted as the on-hook state with respect to an existing connection. Since no further differentiation occurs in this conventional circuit, only one application is possible for the analog subscriber line, such as transmission by voice, modem or fax. According to the prior art, the analog subscriber line can only through-connect one speech channel within a frequency range of approximately 200 Hz through 3400 Hz.

This proven method has the advantage that an approximately nonvolatile line monitoring can be realized in the power-down mode. A disadvantage of the technology according to the prior art is that it does not allow recognition of a further event for a connection request on the analog subscriber line when a first occupancy has already ensued.

SUMMARY OF THE INVENTION

An object of the prevent invention is to improve over the known technology for acquiring a connection request so that a number of connection requests on an analog subscriber line can be recognized and processed.

In particular, the following technical requirements should be fulfilled.

- connecting a further subscriber terminal device, such as an MSFM, to the analog subscriber line in addition to the already connected analog terminal devices,
- no significant interventions with respect to the existing house installation (undoing, rewiring of lines),
- mostly independent operation of the analog terminal devices (telephones, fax machines, etc.) and, for example, of an MSFM device that is connected parallel,
- recognizing the event for the connection setup and initiating the connection with loop direct-current, for purposes of maintaining the advantages of the approximately nonvolatile line monitoring in the power-down mode,
- power management, increasing the loop current when the second occupancy is recognized, for purposes of guaranteeing full functionality of the analog terminal devices and, for example, of the MSFM as far as possible given parallel mode, and
- protocol-controlled interruption of the data transmission, where [sic], otherwise, an uncontrolled interference or, respectively, interruption of the data transmission occurs (calling state, fee impulses, for example).

The above object is achieved in accordance with the invention in a method for recognizing a connection request of telecommunication devices that are connected in parallel to an analog subscriber line, wherein each telecommunication device has a cradle switch, and wherein a connection request can be initiated when the cradle switch is closed. The method thereby uses the state, in which none of the cradle switches of the telecommunication devices is closed and therefore none of the telecommunication devices has initiated a connection request, as a baseline.

Proceeding from a first connection request of one of the telecommunication devices, a connection request is initially acquired by the direct-current level in the subscriber line exceeding a first fixed threshold value by means of closing the appertaining cradle switch. The connection request of a further telecommunication device at the analog subscriber line is acquired as soon as the direct-current level in the subscriber line exceeds a further predetermined threshold value. The further predetermined threshold value lies above the first predetermined threshold value.

The further threshold value can be particularly set depending on the direct-current level and direct-voltage drop at the subscriber line, which direct-current level and direct-voltage drop appears in the steady state after the connection request of the first telecommunication device has been acquired.

The further threshold value can be essentially set as the average value between the direct-current level, which appears after the connection request of the first telecommunication device has been acquired, and the expected value, which results when the further telecommunication device initiates a connection request by means of closing its cradle switch.

The acquisition of the connection request of the further telecommunication device cannot be freed before the expiry of a predetermined waiting period after the connection request of the first telecommunication device has been acquired, so that it can be guaranteed that the steady state for the direct-current and direct-voltage relations at the analog subscriber line is present.

A stabilized power supply can be utilized for the subscriber line. Subsequent to the acquisition of the connection request of the further telecommunication device, the feeding characteristics can be modified such the feed current doubles, for example.

For increasing the feed current, a function referred to as a boost (intensifier) function with an increased feed voltage can be utilized.

Subsequent to the completion of the occupancy of one of the first and the further telecommunication device, the modification of the feeding characteristics can be canceled.

The number of telecommunication devices, which are switched in parallel, can transmit in different frequency bands, in particular, so that the possibility exists for decoupling via filters for reducing their mutual influence on one another.

In a further embodiment of the invention, a telecommunication switching center is provided with a subscriber line interface, which is configured for recognizing connection requests of a number of telecommunication devices, which are connected in parallel to an analog subscriber line. Each telecommunication device have a cradle switch, and a connection request is initiated by means of closing the cradle switch. The subscriber line interface acquires a connection request of a first of the telecommunication devices in by identifying that the direct-current level in the subscriber line exceeds a first fixed threshold value. A connection request of a further telecommunication device of the same analog subscriber line is acquired by identifying that the direct-current level in the subscriber line exceeds a further fixed threshold value, which is higher than the first fixed threshold value.

The telecommunication switching center can include a storage unite for the direct-current level and direct-voltage drop at the subscriber line, which appears in the steady state after the connection request of the first telecommunication device has been acquired. Further, a calculation unit for calculating the further threshold value can be provided, which threshold value essentially equals the average value between the direct-current level, which appears after the connection request of the first telecommunication device has been acquired, and the expected value, which results when the further telecommunication device initiates a connection request by means of closing its cradle switch.

A stabilized power supply can be provided for the subscriber line, whereby the feeding characteristics of the stabilized power supply, subsequent to the acquisition of the connection request of the further telecommunication device, is modified for purposes of increasing, particularly doubling, the feed current.

DESCRIPTION OF THE PREFERRED EMBODIMENTS

Figure 1:
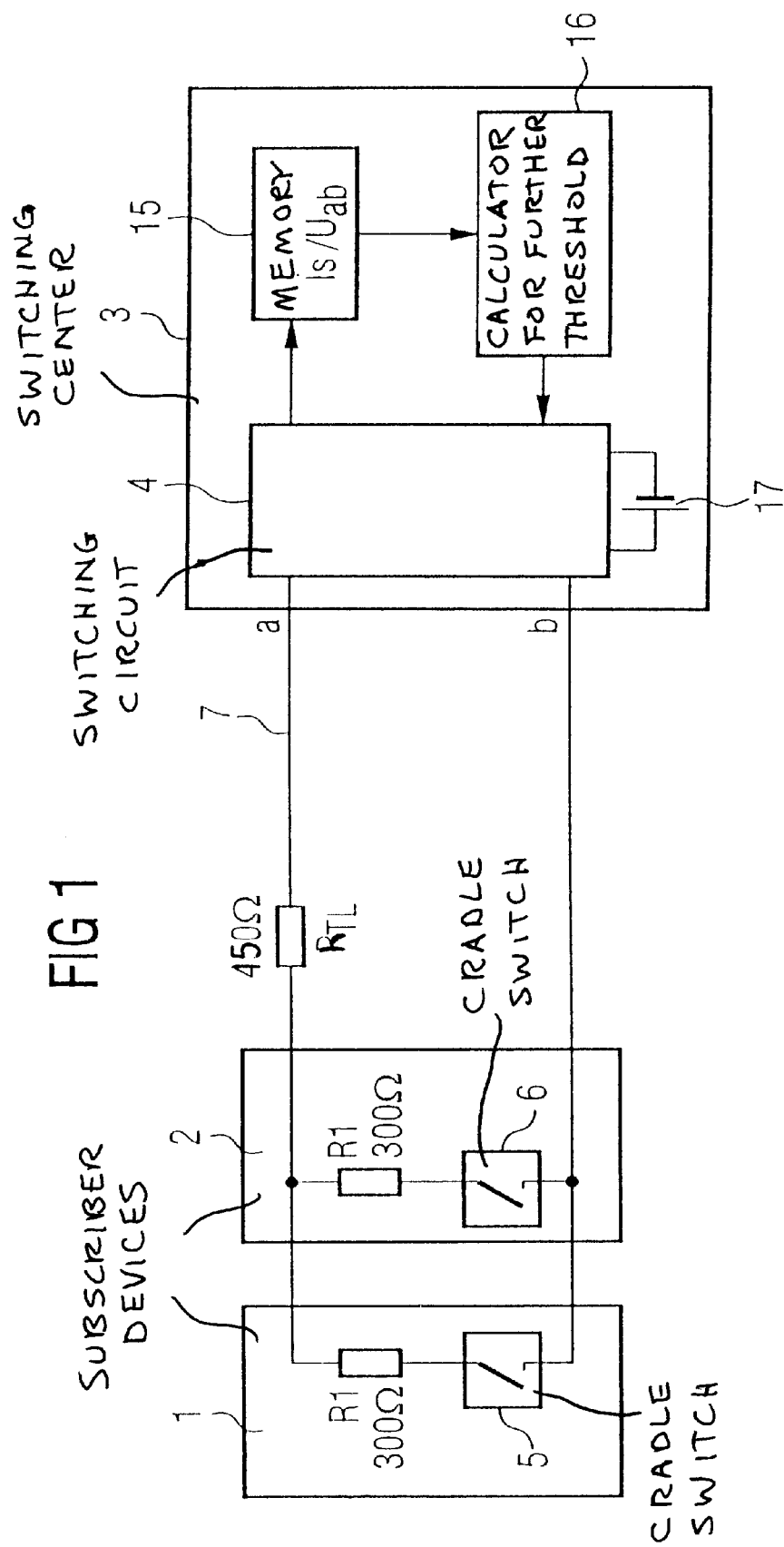
FIG. 1 shows an inventive circuit for number of subscriber terminal devices connected in parallel to the same analog subscriber line.

FIG. 1 explains the electrical relations in the environment of the subscriber line 7. Two devices 1 and 2, one of which can be an analog telephone and the other an MSFM modem, for example, are connected in parallel to the subscriber line 7 with two leads a, b. It is assumed that the subscriber terminal devices 1, 2 have respective internal d.c. resistances R1 and R2, with $R1=R2=300\Omega$ Each of the subscriber terminal devices 1, 2 can initiate a connection request by means of closing a cradle switch 5 or 6.

It is also assumed that the copper resistance of the subscriber line $R_{TL}=450\Omega$ as corresponds to an average line length of approximately 1.7 km. The subscriber terminal devices 1, 2 are connected to a subscriber circuit 4 of a switching center 3 by means of the subscriber line 7.

A constant power source is provided in the switching center 3 for the subscriber circuit 4, so that the subscriber line 7 can be fed, whereby the constant power source is symbolically referred to as 17.

When a subscriber terminal device is operated at the analog subscriber circuit 4, the subscriber circuit 4 monitors the line potentials or the line currents. When the loop closure is normal (loop resistance between 0Ω and maximal feed range), a loop current within the range of approximately 20 mA through 100 mA arises depending on the feed characteristics (stabilized power supply 17 or resistance feed) and loop resistance. Preferably, the threshold of the loop current indicator in the subscriber circuit 4 is fixed at approximately 50% of the minimal feed current, and therefore at approximately 10 mA.

Therefore, all loop currents that exceed this threshold are interpreted as occupancy. According to the present invention, current changes and/or voltage changes which occur as a result of the off-hook state of the second subscriber terminal device during an already existing connection, are also recognized and evaluated. The same is valid in the opposite direction, which means for the case of the on-hook state of a terminal device when a second subscriber device is occupied in parallel.

The sequence of operations according to the invention can be represented as follows:

All subscriber terminal devices are in an on-hook state (which means that the loop current is below a first indication threshold (threshold value), a first subscriber terminal device (telephone or MSFM) changes from on-hook to off-hook (loop closure), the subscriber circuit 4 recognizes the occupancy by the first subscriber terminal device after expiry of a protection time of a few milliseconds, after a waiting period of, for example, 100 ms for the purpose of reaching a stable, steady DC operating point in the subscriber line 7 (transience of the DC loop), the voltage drop $U_{ab}$ between the a/b-leads and the DC loop current Is can be measured by means of, for example, an integrated test function in the subscriber line interface circuit (SLIC) and can be stored in a storage unit 15, a further threshold value is calculated in a calculator 16 by means of the stored direct-current and direct-voltage values, so that a further occupancy can be determined.

The following resistance relations result regarding the situation of FIG. 1:

a) Both subscriber terminal devices 1, 2 in on-hook state: resistance ∞Ω, b) first subscriber device in off-hook state: resistance 750Ω, and c) both subscriber terminal devices 1, 2 in off-hook state: resistance 600Ω.

In other words, a copper resistance of the subscriber line 7 of approximately 450Ω results given an average line length of 1.7 km. In the example, the two subscriber terminal devices (telephone and MSFM) have a DC resistance of 300 Ω. When a second terminal device goes off-hook during an existing occupancy, the loop resistance therefore reduces from 750Ω to 600Ω according to this example.

Therefore, the second threshold value for the loop current Is can be set such that it approximately lies midway between the direct-current levels which result in the case of one or two events. This would mean in the present example that the second indication threshold (second threshold value) is calculated on the basis of a resistance value of $$R = \frac{750 + 600}{2} \Omega = 675\Omega$$

As soon as the loop current Is exceeds this further increased threshold value, it is determined that the second subscriber terminal device has also gone in the off-hook state and has initiated a connection request as a result.

The reduction of the dissipated power for short and medium-long lines is frequently achieved with the aid of a stabilized power supply. Thereby, the current values lie only slightly above the required minimal value. In order to avoid a limitation of the functionality with respect to the terminal devices under most circumstances, the feed characteristic is inventively modified when the second occupancy is recognized (the loop current Is exceeds the second threshold value), such that the feed currents approximately double their value (from 20 mA to 40 mA, for example). If required, the boost function (intensifier function) with increased feed voltage can be utilized for increasing the feed range. This function is generally provided in subscriber circuits.

When the loop resistances are extremely high, however, a limitation of the functionality cannot be ruled out for physical reasons.

Depending on the type of the further occupancy (depending on the first occupancy), devices necessary for the further connection setup are connected for the connection setup (dial tone, code receiver for selection code acceptance or data transmission devices, for example).

When a terminal device goes from the off-hook state back again to the on-hook state, this is recognized by the loop current Is downwardly transgressing the second, higher threshold value again. Subsequently, the feed can be reduced again to the original value.

A differentiation between the completion of a data transmission and the completion of a speech transmission can ensue by of software.

A B-sided occupancy (called subscriber) ensues via the calling signal with respect to the analog subscriber and via the protocol (via pilot tone, start protocol, for example) with respect to the MSFM, since occupancy requests (loop closure) can ensue via modem data given the MSFM. Thus, unnecessary acoustic annoyances to the subscriber are avoided when there is to be a B-sided occupancy of the MSFM.

Uncontrolled disturbances of the data transmission can occur when fee impulses are sent or can occur during the call itself, for example. However, these disturbances can be prevented when the data transmission is temporarily interrupted in a controlled manner, by means of the above explained call processing, prior to the output of the fee impulses or of the calling signal.

Figure 2:
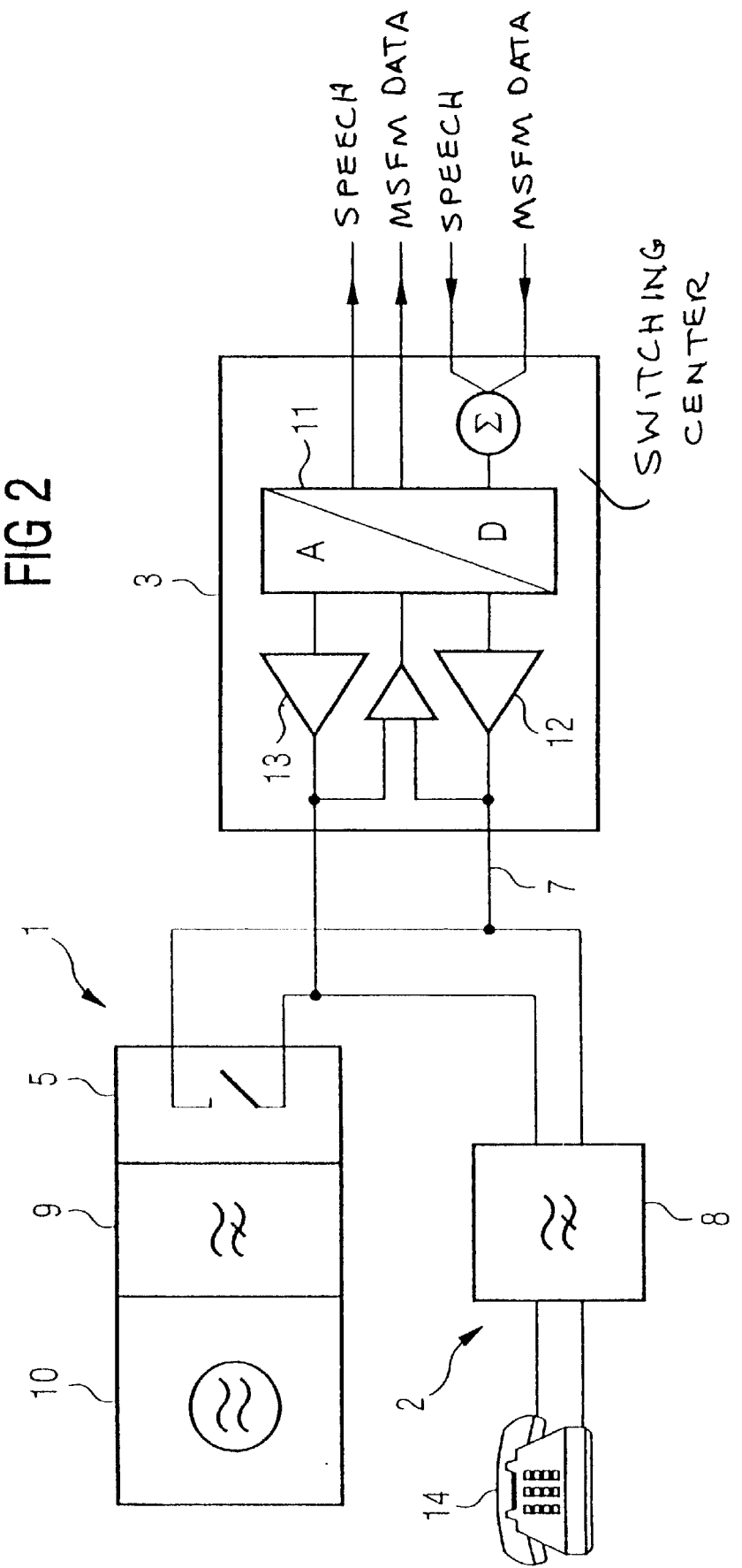
FIG. 2 illustrates an application case of the present invention, wherein an MSFM modem is switched in parallel in addition to an analog telephone.
Figure 3:
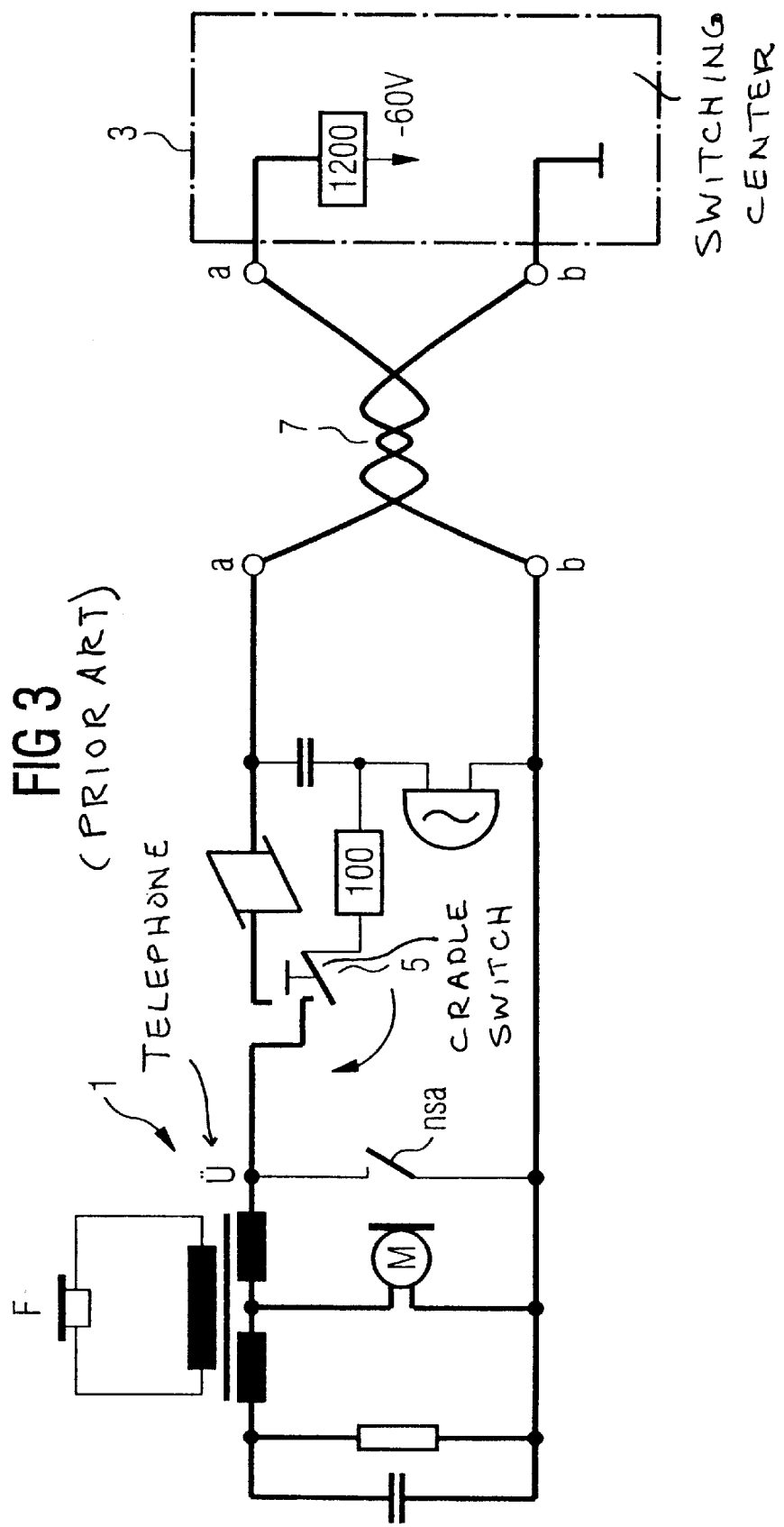
FIG. 3, as noted above, is a circuit diagram in an analog telephone according to the prior art.

On the basis of FIG. 2, an application of the present invention with respect to a parallel circuit of an MSFM (Multi Standard Fast Modems) and of an analog telephone 14 at a common analog subscriber line 7 is described.

The two subscriber terminal devices 1, 2 are separated and decoupled in that they transmit in different frequency ranges. Therefore, a decoupling ensues by means of a high-pass filter 9 for the MSFM, or by means of a low-pass filter 8 for the analog telephone 14. Amplifiers 12, 13 and an A-D converter 11 are provided in the switching center 3, so that the further switching of the voice data and of the MSFM data can ensue digital.

As a result of the inventive method, it is possible to set up, through-switch and initiate speech connections and data connections in arbitrary order on one and the same subscriber line. In summary, the inventive circuit arrangement recognizes a further event state (initiating a connection request) at an analog subscriber line with respect to data-over-voice applications for the independent connection setup and connection cleardown of the voice connection and the data connection.

Although other modifications and changes may be suggested by those skilled in the art, it is the intention of the inventor to embody within the patent warranted hereon all changes and modifications as reasonably and properly come within the scope of their contribution to the art.

I claim as my invention:

1. A method for recognizing respective connection requests from telecommunication devices connected in parallel to an analog subscriber line, each of said telecommunication devices having a cradle switch and a connection request being initiated from the telecommunication device when said cradle switch is closed, said method proceeding from a state wherein none of said cradle switches of the telecommunication devices is closed, and comprising the steps of:

acquiring a connection request from a first of said telecommunication devices by identifying that a direct-current level in said subscriber line exceeds a first threshold value, as a result of the cradle switch of said first of said telecommunication devices being closed; and acquiring a connection request of a further of said telephone devices by determining that said direct-current level in said subscriber line exceeds a further threshold value which is higher than said first threshold value.

2. A method as claimed in claim 1, comprising the step of setting said first threshold value dependent on a direct current level and voltage drop at said subscriber line which are present in a steady state after said connection request of said first of said telecommunication devices has been acquired.

3. A method as claimed in claim 2, comprising setting said further threshold value as an average value between said direct current level which exists on said subscriber line after said connection request of said first of said telecommunication devices has been acquired, and an expected value which results when said further telecommunication device initiates a connection request by closing the cradle switch of said further telecommunication device.

4. A method as claimed in claim 1, comprising enabling acquisition of said connection request from said further telecommunication device only after expiration of a predetermined waiting period following acquisition of said connection request of said first of said telecommunication devices.

5. A method as claimed in claim 1, comprising the steps of:
supplying a feed current to said subscriber line from a stabilized power supply, having feed characteristics associated therewith; and
modifying said feed characteristics of said stabilized power supply after acquisition of said connection request from said further telecommunication device to increase said feed current.

6. A method as claimed in claim 5, wherein said stabilized power supply has a feed voltage associated with said feed current, and wherein the step of modifying the feed characteristics comprises implementing a boost function with an increased in said feed voltage to increase said feed current.

7. A method as claimed in claim 5, comprising the additional step of canceling said modification of said feed characteristics after completion of occupancy of said subscriber line by one of said first of said telecommunication devices and said further telecommunication device.

8. A method as claimed in claim 1, comprising the step of said telecommunication devices respectively transmitting in different frequency bands on said subscriber line.

9. An arrangement for recognizing respective connection requests from telecommunication devices connected in parallel to an analog subscriber line, each of said telecommunication devices having a cradle switch and a connection request being initiated from the telecommunication device when said cradle switch is closed, said arrangement enabling proceeding from a state wherein none of said cradle switches of the telecommunication devices is closed, said arrangement comprising:
a switching center which acquires a connection request from a first of said telecommunication devices by identifying that a direct-current level in said subscriber line exceeds a first threshold value, as a result of the cradle switch of said first of said telecommunication devices being closed; and
said switching center acquiring a connection request of a further of said telecommunication devices by determining that said direct-current level in said subscriber line exceeds a further threshold value which is higher than said first threshold value.

10. An arrangement as claimed in claim 9, wherein said switching center sets said first threshold value dependent on a direct current level and voltage drop at said subscriber line which are present in a steady state after said connection request of said first of said telecommunication devices has been acquired.

11. An arrangement as claimed in claim 10, wherein said switching center sets said further threshold value as an average value between said direct current level which exists on said subscriber line after said connection request of said first of said telecommunication devices has been acquired, and an expected value which results when said further telecommunication device initiates a connection request by closing the cradle switch of said further telecommunication device.

12. An arrangement as claimed in claim 9, wherein said switching center enables acquisition of said connection request from said further telecommunication device only after expiration of a predetermined waiting period following acquisition of said connection request of said first of said telecommunication devices.

13. An arrangement as claimed in claim 9, comprising:
a stabilized power supply which supplies a feed current to said subscriber line, having feed characteristics associated therewith; and
means for modifying said feed characteristics of said stabilized power supply after acquisition of said connection request from said further telecommunication device to increase said feed current.

14. An arrangement as claimed in claim 13, wherein said stabilized power supply has a feed voltage associated with said feed current, and wherein said means for modifying the feed characteristics implements a boost function with an increased in said feed voltage to increase said feed current.

15. An arrangement as claimed in claim 5, comprising means for canceling said modification of said feed characteristics after completion of occupancy of said subscriber line by one of said first of said telecommunication devices and said further telecommunication device.

16. An arrangement as claimed in claim 1, wherein said switching center switches said telecommunication devices in parallel with said telecommunication devices respectively transmitting in different frequency bands on said subscriber line.

* * * * *